United States Patent [19]

Jhun

[11] 4,396,842
[45] Aug. 2, 1983

[54] TIDAL POWER GENERATION UTILIZING THE ATMOSPHERIC PRESSURE

[76] Inventor: Bonghan Jhun, c/o Myungsuk Park, 410-140 Sooyoo 5-Dong, Dobong-Ku, Seoul, Rep. of Korea

[21] Appl. No.: 310,110

[22] Filed: Oct. 9, 1981

[30] Foreign Application Priority Data

Nov. 10, 1980 [KR] Rep. of Korea .......................... 3916

[51] Int. Cl.³ ............................................ F03B 13/12
[52] U.S. Cl. ..................................... 290/42; 290/1 R; 290/43; 290/108; 290/119
[58] Field of Search ...................... 290/1 R, 42, 43, 53, 290/54; 60/398; 415/108, 119

[56] References Cited

U.S. PATENT DOCUMENTS

| | | | |
|---|---|---|---|
| 200,245 | 2/1878 | Bois | 417/119 |
| 1,144,342 | 6/1915 | Andrews | 417/108 |
| 3,754,147 | 8/1973 | Hancock et al. | 290/1 R |
| 4,117,676 | 10/1978 | Atencio | 60/398 |
| 4,182,123 | 1/1980 | Ueda | 60/398 |
| 4,288,985 | 9/1981 | Dyck | 290/53 |

FOREIGN PATENT DOCUMENTS

| | | | |
|---|---|---|---|
| 52-53162 | 4/1977 | Japan | 60/398 |
| 850112 | 9/1960 | United Kingdom | 60/398 |

Primary Examiner—J. V. Truhe
Assistant Examiner—Shelley Wade
Attorney, Agent, or Firm—Joseph J. Goluban

[57] ABSTRACT

A strong air suction is created by installing an air tube on the top of the discharge side of a large siphoning tube over a dam to drive air turbines for electricity generation. To facilitate the discharge of air bubbles, the intake air thru the air tube is manipulated thru a plate with numerous small holes located at the air exit to the water discharge tube and thru small tubes in the water discharge tube so that the air is discharged as small bubbles.

40 Claims, 3 Drawing Figures

TIDAL POWER GENERATION UTILIZING THE ATMOSPHERIC PRESSURE

BRIEF SUMMARY OF INVENTION

This invention is a method of tidal power generation utilizing the atmospheric pressure that requires simple and relatively inexpensive power generating facilities that would convert the potential energy of the tides into kinetic energy of air for driving the air turbines in a power plant.

Characteristics of this invention include:
(1) the air pressure exerted on an air turbine can be maintained at 1 atm. regardless of the water head.
(2) higher tidal energy conversion efficiency can be obtained by flowing larger quantities of water in a shorter time period.
(3) the generating turbine(s) can be located at a convenient place remote from the reservoir.
(4) equipment corrosion due to salt is minimized.

DETAILED DESCRIPTION

Figure 1:
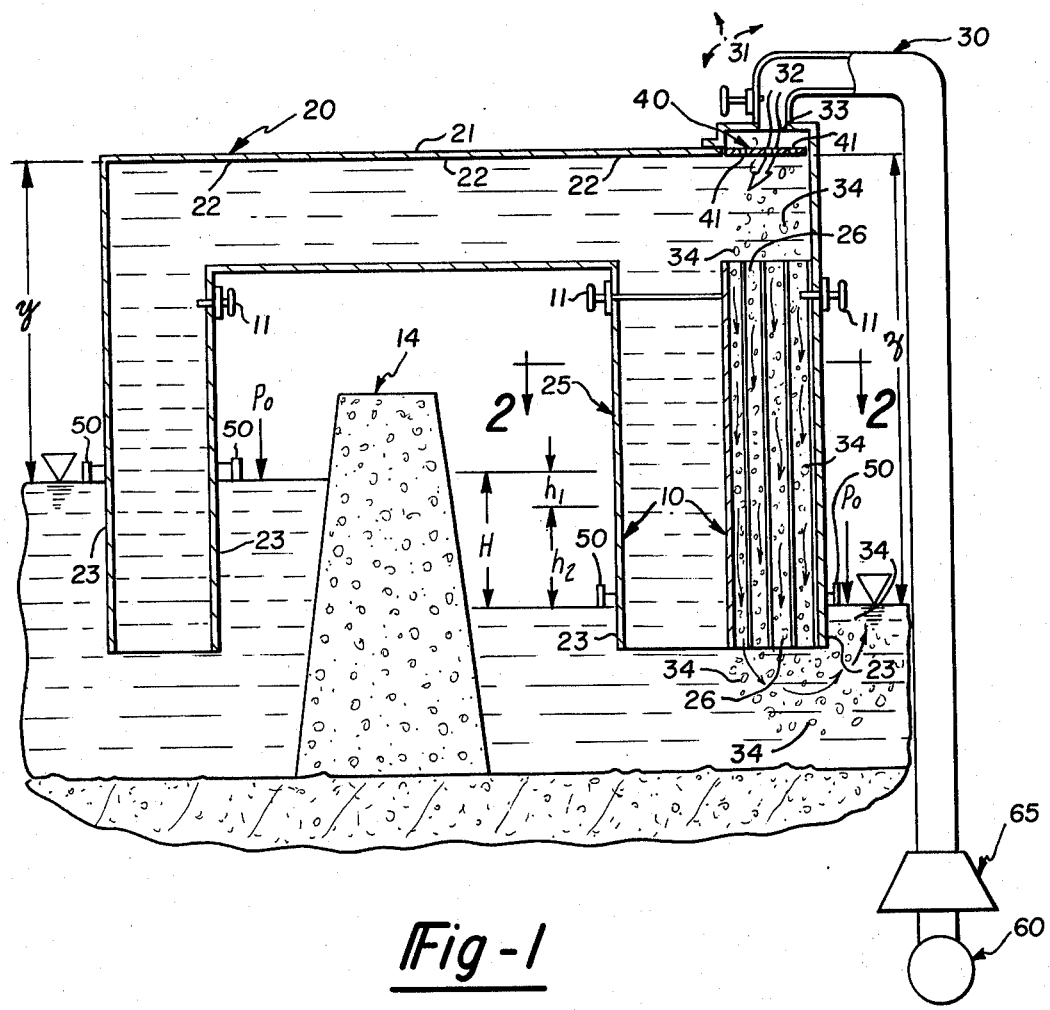
FIG. 1 is the system cross-sectional view for the explanation of this invention.

The invention described herein is suitable for tidal power generation or low head hydroelectric power generation and the system description is as follows:

As shown in FIG. 1, an inverted U tube (water tube) 20 filed with water is installed over a dam 14 connecting pools A and B. When the water head difference is H, the water flows from pool A to pool B through the water tube 20 due to a siphoning effect. The water tube 20 is raised to a certain level so that the pressure at the top 22 of the water tube 20 is lowered to near zero. Then the pressure difference between the outside 21 and the inside top 22 of the water tube 20 is maintained at 1 atm. regardless of the head difference between pools A and B.

An air tube 30 (FIG. 1) is installed at the top 21 of the water tube 20 (discharge side) so that the outside air 31 can be drawn into the water tube 20, creating a strong suction force (1 atm.). Thus converting the potential energy of the water into the kinetic energy of air for operating the air turbine(s) for the generation of electricity.

Assuming that the instantaneous total amount of intake air 32 in the water tube 20 is equivalent to $h_2$ of the water tube 20 (FIG. 1), then $h_1$ will be the necessary head to maintain the water flow in the water tube 20. The theoretical power output due to the air suction through the air tube 30 may be written in MKS unit, as;

$$P_w = g \cdot Q \cdot (H - h_1) \, KW, \text{ or;} \quad (1)$$

$$P_w = g \cdot Q \cdot h_2 \, KW$$

where
g = acceleration of gravity
Q = flow rate

As shown in equation (1), the smaller $h_1$ results in a greater $P_w$ for a given flow rate. Therefore, the $h_1$ should be maintained as small as possible in order to maximize the amount of intake air ($h_2$).

In general, when air is drawn in at the inside top 22 of the water tube 20, it obstructs or in severe case, stops the water flow in the water tube 20. In order to discharge the air drawn into the water tube 20 and to continue the water flow, the following methods can be used:

(1) If the intake air 32 is broken up into small bubbles 34 in the water, the air bubbles can be discharged even with low velocity water stream, in other words, with smaller velocity head because a small bubble 34 will be less buoyant than a larger bubble. Therefore, an air plate 40 with numerous small holes 41 can be installed at the air tube exit 33 to the water tube 20 (in order to convert the intake air into small bubbles 34).

Figure 2:
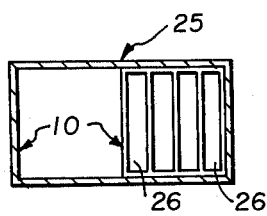
FIG. 2 is a cross-sectional view of the water discharge tube taken along section lines 2—2 of FIG. 1 showing the water tube X and air intake small tubes.
Figure 3:
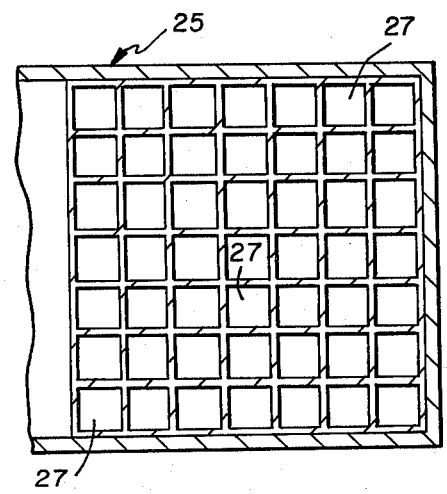
FIG. 3 is an exploded fragmentary cross-section view similar to FIG. 2 showing a different shape for the air intake small tubes.

(2) If the cross-section of the water discharge tube 25 is too large, the small air bubbles 34 in the water may combine to form a large bubble while being discharged and will require high velocity water stream, in other words, greater kinetic energy of the water for discharge due to greater buoyancy of the large bubble (not shown). In order to minimize the required kinetic energy for discharge, the water discharge tube 25 can be divided into small tubes 26, 27 as shown in FIG. 2 or FIG. 3. However, the cross-sectional area of an individual small tubes 26, 27 must be carefully determined because a smaller tube cross-section results in higher frictional losses.

(3) As an alternative of the method described in (1), the intake air 32 may be drawn in pulsations which enables the air and water to be discharge in air-water layers.

In order to achieve zero pressure at the inside top 22 of the water tube 20 (for a stronger suction force), the height of the water tube 20 can be determined as follows: let P be the pressure (head plus the atmospheric pressure), v the velocity of the water at the top 22 of the water tube 20 and z the height from the water level in pool B (FIG. 1).

By applying Bernouille's equation between the top 22 of the water tube 20 and the water level in pool A, and assuming that the water is an ideal fluid, then:

$$H + \frac{P_O}{W} = Z + \frac{P}{W} + \frac{v^2}{2g}$$

where
$P_o$ = atmospheric pressure
W = specific weight of water
g = acceleration of gravity
P/W = pressure head
$v^2/2g$ = velocity head
z = height from the water level in pool B Let P=o, then;

$$z = H + \frac{P_o}{W} - \frac{v^2}{2g}$$

Since $h_1 = v^2/2g$, and one atmospheric pressure is equivalent to approximately 10 meters of water column, $$z = H + 10 - h_1$$

and since $H = h_1 + h_2$, $$z = 10 + h_2 \qquad (2)$$

Therefore, from the water level of pool A, the height y of the top 22 of the water tube 20 will be $(10 - h_1)$ meters. In actual practice, the height y of the inside top 22 of the water tube 20 should be kept below $(10 - h_1)$ meters because of the energy losses in a non-ideal fluid flow such as in water (due to entrance, bends and friction).

$$y = 10 = h_1 \qquad (3)$$

Also it was found in experiments that, when the pressure at the inside top 22 of the water tube 20 approaches zero, the air dissolved in the water separates from the water reducing the amount of intake air 32 through the air tube 30. Therefore, the water tube 20 height must be carefully determined so that the air separation will not occur in the water tube 20.

In the tidal power generation, the water head H varies continuously. Hence the water tube 20 height should be adjusted which may be accomplished by attaching adjustable floats 50 near the bottom 23 of the water tube 20. In order to provide a sluice between pools A and B, another water tube X 10 with a gate 11 (FIG. 1) may be installed next to the main water discharge tube 25.

The invention described above is suitable for tidal power generation or low head hydroelectric power generation.

(1) Application of this invention for tidal power generation:

Unlike the conventional systems which require complex hydroelectric power plant facilities, this invention requires only a simple dam 14, several water tubes 20 over the dam 14 and generating turbines 60. The air tubes 30 from each water tube 20 can be connected in series in order to supply greater air flow for larger capacity air turbines 65. This invention may be used also for the single-pool, two way application by installing the water tubes 20 symmetrically about the dam 14. This invention offers the following advantages over the conventional system:

(1) low construction cost
(2) shorter construction time
(3) minimum equipment corrosion resulting from salt
(4) more effective utilization of available water head due to the larger water flow capacity of this invention
(5) larger capacity basins can be constructed for greater power generation capacity because of the lower construction cost
(6) may be used as an efficient pumped storage planty by coupling the air turbine to water pump.

(2) Application of this invention for hydroelectric power generation:

Since this invention requires simple and inexpensive facilities, power plant can be constructed at a lower cost and in a shorter time. Therefore, this invention can be utilized at several individual locations along a river to provide electricity from a low head hydroelectric power plant (lower than 10 meters in order to minimize the flood area) to several localities along the river, thus utilizing the unless otherwise wasted water resources.

I claim:

1. A device for hydroelectric power generation in low water head situations utilizing the atmospheric pressure, comprising; a water tube disposed between two (2) pools of water at different elevations, said water tube being of a U-shape with an inlet and discharge side, means to mount said water tube at a predetermined elevation above the water pools as to produce a near zero pressure at the inside top of said water tube, said water tube having a discharge side consisting of a sluice section through which the excess over flow water may be discharged and a plurality of smaller size tubes to prevent the aggregation of air bubbles entrapped within the water, said air bubbles having entered the discharge side of the water tube through an opening located at the apex of the water tube; and an air tube connected to the opening located at the apex of the water tube on the discharge side, said air tube having an air plate disposed within said opening into which the air tube exists into the water tube.

2. A device for hydroelectric power generation, as defined in claim 1, wherein said air plate has a plurality of small holes located therein to convert the intake air into small air bubbles.

3. A device for hydroelectric power generation, as defined in claim 2, wherein said predetermined elevation of the water tube above the lower water pool is $Z = 10 + H_2$, Z being the distance above the surface of the lower water pool to the inside top of the water tube, $H_2$ is the instantaneous total amount of intake air in the water tube and 10 being equal to approximately 10 meters of water column.

4. A device for hydroelectric power generation, as defined in claim 3, wherein valves are disposed in the inlet and discharge side of the water tube and the air tube exit, which allows the regulation of the rate of flow of both the water and air.

5. A device for hydroelectric power generation, as defined in claim 4, further comprising an air turbine, said air turbine being connected by suitable means to said air tube.

6. A device for hydroelectric power generation, as defined in claim 5, further comprising an electric generator, said electric generator being connected by suitable means to said air turbine.

7. A device for hydroelectric power generation, as defined in claim 6, wherein a plurality of water tubes are used, with means to connect the plurality of air tubes in series to increase the air flow within said air turbine.

8. A device for hydroelectric power generation, as defined in claim 7, wherein the water tube discharge side has a rectangular cross section.

9. A device for hydroelectric power generation, as defined in claim 7, wherein the water tube discharge side has a square cross section.

10. A device for hydroelectric power generation, as defined in claim 2, wherein said predetermined elevation of the water tube above the higher water pool is $Y = 10 - H_1$, Y being the distance above the surface of the higher water pool to the inside top of the water tube, $H_1$ is the necessary head to maintain the water flow in the water tube, and 10 being equal to approximately 10 meters of water column.

11. A device for hydroelectric power generation, as defined in claim 10, wherein valves are disposed in the inlet and discharge side of the water tube and the air tube exit which allows the regulation of the rate of flow of both the water and air.

12. A device for hydroelectric power generation, as defined in claim 11, further comprising an air turbine, said air turbine being connected by suitable means to said air tube.

13. A device for hydroelectric power generation, as defined in claim 12, further comprising an electric generator, said electric generator being connected by suitable means to said air turbine.

14. A device for hydroelectric power generation, as defined in claim 13, wherein a plurality of water tubes are used, with means to connect the plurality of air tubes in series to increase the air flow within said air turbine.

15. A device for hydroelectric power generation, as defined in claim 14, wherein the water tube discharge side has a rectangular cross section.

16. A device for hydroelectric power generation, as defined in claim 14, wherein the water tube discharge side has a square cross section.

17. A device for tidal power hydroelectric generation utilizing the atmospheric pressure, comprising; a water tube disposed between two (2) pools of water at different elevations, said water tube being of a U-shaped with an inlet and discharge side, means to mount said water tube at a predetermined elevation above the water pools as to produce a near zero pressure at the inside top of said water tube, said water tube have a discharge side consisting of a sluice section through which the excess over flow water may be discharged and a plurality of smaller size tubes to prevent the aggregation of air bubbles entrapped within the water, said air bubbles having entered the discharge side of the water tube through an opening located at the apex of the water tube; an air tube connected to an opening located at the apex of the water tube on the discharge side, said air tube having an air plate disposed within said opening into which the air tube exits into the water tube, and adjustable floats, said adjustable floats being attached by suitable means to both the inlet and discharge side of said water tube in order to maintain the predetermined elevation of the inside top of said water tube above the water pools as the elevation of water varies due to the fluctuation of tidal water.

18. A device for tidal power hydroelectric generation, as defined in claim 17, wherein said air plate has a plurality of small holes located therein to convert the intake air into small air bubbles.

19. A device for tidal power hydroelectric generation, as defined in claim 18, wherein said predetermined elevation of the water tube above the lower water pool is $Z = 10 + H_2$, Z being the distance above the surface of the lower water pool to the inside top of the water tube, $H_2$ is the instantaneous total amount of intake air in the water tube and 10 being equal to approximately 10 meters of water column.

20. A device for tidal power hydroelectric generation, as defined in claim 19, wherein valves are disposed in the inlet and discharge side of the water tube and the air tube exit which allows the regulation of the rate of flow of both the water and air.

21. A device for tidal power hydroelectric generation, as defined in claim 20, further comprising an air turbine, said air turbine being connected by suitable means to said air tube.

22. A device for tidal power hydroelectric generation, as defined in claim 21, further comprising an electric generator, said electric generator being connected by suitable means to said air turbine.

23. A device for tidal power hydroelectric generation, as defined in claim 22, wherein a plurality of water tubes are used, with means to connect the plurality of air tubes in series to increase the air flow within said air turbine.

24. A device for tidal power hydroelectric generation, as defined in claim 23, wherein the water tube discharge side has a rectangular cross section.

25. A device for tidal power hydroelectric generation, ad defined in claim 23, wherein the water tube discharge side has a square cross section.

26. A device for tidal power hydroelectric generation, as defined in claim 18, wherein said predetermined elevation of the water tube above the higher water pool is $Y = 10 - H_1$, Y being the distance above the surface of the higher water pool to the inside top of the water tube, $H_1$ is the necessary head to maintain the water flow in the water tube, and 10 being equal to approximately 10 meters of water column.

27. A device for tidal power hydroelectric generation, as defined in claim 26, wherein valves are disposed in the inlet and discharge side of the water tube and the air tube exit which allows the regulation of the rate of flow of both the water and air.

28. A device for tidal power hydroelectric generation, as defined in claim 27, further comprising an air turbine, said air turbine being connected by suitable means to said air tube.

29. A device for tidal power hydroelectric generation, as defined in claim 28, further comprising an electric generator, said electric generator being connected by suitable means to said air turbine.

30. A device for tidal power hydroelectric generation, as defined in claim 29, wherein a plurality of water tubes are used, with means to connect the plurality of air tubes in series to increase the air flow within said air turbine.

31. A device for tidal power hydroelectric generation, as defined in claim 30, wherein the water tube discharge side has a rectangular cross section.

32. A device for tidal power hydroelectric generation, as defined in claim 30, wherein the water tube discharge side has a square cross section.

33. A method of generating electricity utilizing the water head potential energy behind a dam, by converting it into kinetic energy of air for driving air turbines connected to an electric generator, said method including the steps of placing a water tube or tubes (siphon) over a dam, priming the water tube to allow siphoning of the water, adjusting the height of the water tube to a predetermined distance above the water surface so that the pressure at the inside top of the water tube is nearing zero atmospheric pressure, connecting an air tube to the discharge side of the top of the water tube, regulating the rate of flow of both the water and intake air by means of gate valves, and connecting said air tube to an air turbine which operates an electrical generator.

34. The method as recited in claim 33, and further including the step of placing an air plate with a plurality of holes at the exit of the air tube on the discharge side of the water tube.

35. The method as recited in claim 34, and further including the step of placing small tubes into the discharge side of the water tube, to prevent the aggregation of the air bubbles into larger ones.

36. The method as recited in claim 35, and further including the step of attaching adjustable floats to the water tube to maintain its predetermine height above a fluctuating water pool.

37. The method as recited in claim 36, and further including the step of placing a plurality of water tubes over the dam.

38. The method as recited in claim 37 and further including the step of connecting the plurality of air tubes attached to the water tubes in series.

39. The method as recited in claim 38 and further including the step of calculating said predetermined elevation of the water tube above the lower water pool using the formula $Z = 10 + H_2$.

40. The method as recited in claim 38 and further including the step of calculating said predetermined elevation of the water tube above the higher water pool using the formula $Y = 10 - H_1$.

* * * * *